May 17, 1932.  H. FEIK  1,859,272
HAY BALER
Original Filed Dec. 29, 1928   2 Sheets-Sheet 2

Inventor
Harrison Feik

By Clarence A. O'Brien
Attorney

Patented May 17, 1932

1,859,272

UNITED STATES PATENT OFFICE

HARRISON FEIK, OF EMPORIA, KANSAS

HAY BALER

Application filed December 29, 1928, Serial No. 329,289. Renewed April 8, 1932.

The present invention relates to improvements in hay balers and has reference more particularly to an improved feed device for association with the reciprocating plunger rod, so that when the plunger rod is drawn rearwardly in the baling chamber, the feeding mechanism is moved to an operative position to press the hay down in the baling chamber and as the plunger goes forwardly in said chamber, the feeder is raised to an inoperative position.

Another important object of the invention is to provide a hay baler wherein the feeder is provided with means for cooperation with the vertically movable blocker, whereby the block will be pushed downwardly in the chamber ahead of the plunger.

Another important object is to provide a hay baler of the above mentioned character wherein the feeding means for the baling chamber will at all times be positive and efficient as well as automatic in its operation, said feeding mechanism being of such construction as to permit the installation thereof upon a conventional hay baler without necessitating any material alterations.

Another important object is to provide a hay baler of the above mentioned character which is simple in construction, inexpensive, strong and durable and further well adapted to the purpose for which it is designed.

Other objects of the invention will become apparent as the nature of the invention proceeds and when taken in connection with the accompanying drawings.

In the accompanying drawings, forming a part of this application and wherein like reference characters designate like parts throughout the several views.

Figure 1:
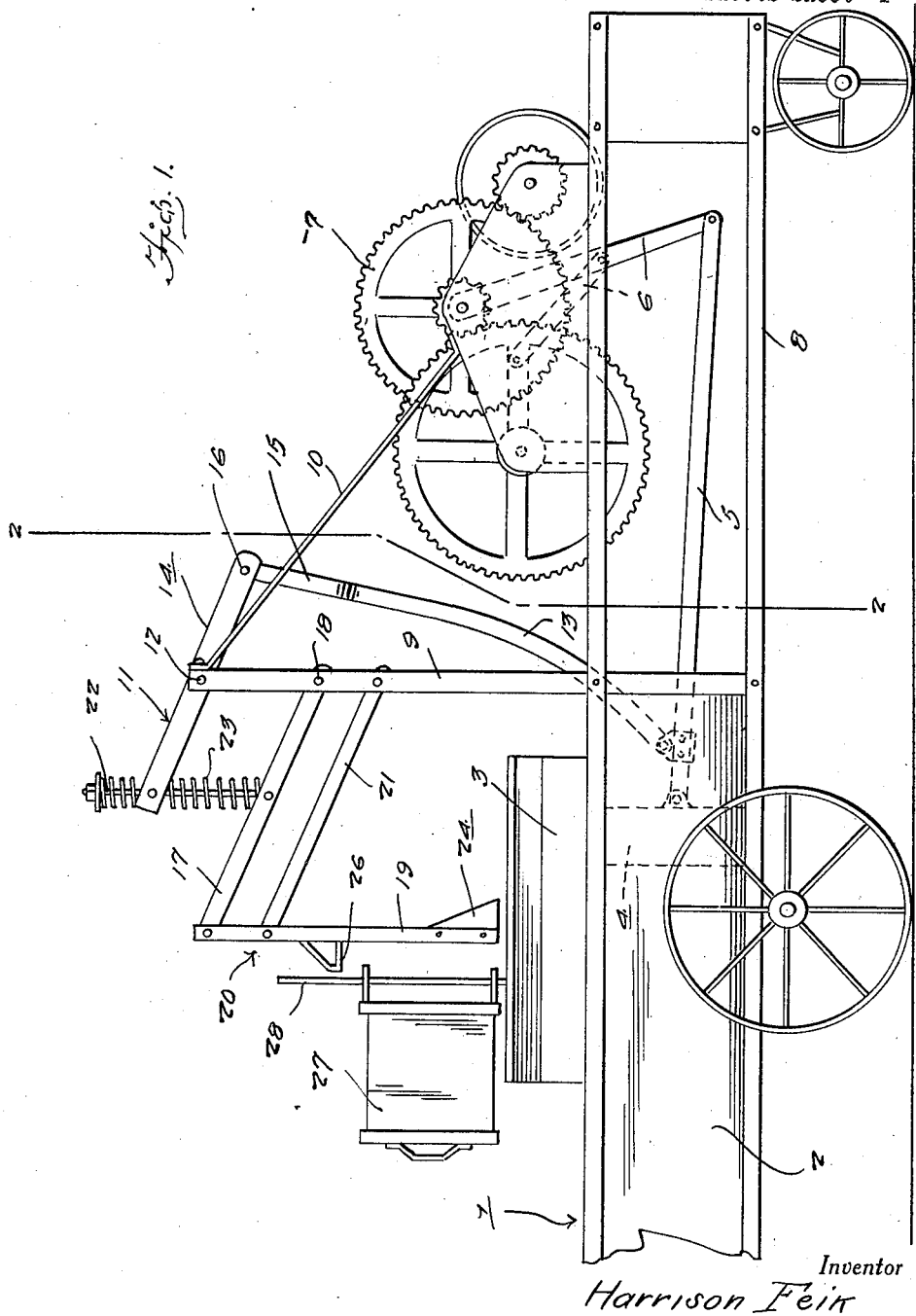
Figure 1 is a side elevation of a hay baler embodying my improved feeding mechanism, the forward end portion of the baling chamber being broken away.

In the drawings, wherein for the purpose of illustration is shown the preferred embodiment of my invention, the numeral 1 designates generally a conventional hay baler, wherein the same includes the baling chamber 2, having a conventional filling hopper 3 arranged at the top of the rear end portion thereof. Arranged within the rear end portion of the baling chamber 2 for reciprocatory movement therein is the usual plunger 4, the same being mounted on the forward end of the plunger rod 5 that extends through the rear end of the baling chamber and which plunger rod is operatively connected at its rear end by a suitable link mechanism indicated at 6, to the gear train 7, that may be operated from any suitable source of power, in a manner also well known in the art.

Extending upwardly from the sides of the frame 8 of the hay baler at a point adjacent the rear end of the baling chamber 2 are the standards 9 and suitable bracing means is provided for the upper ends of these standards as indicated at 10. A walking beam 11 is pivotally supported intermediate its ends on a cross rod 12 that is arranged between the upper ends of the spaced standards 9 and the rear end of this walking beam is operatively connected to the plunger 5 at a point rearwardly of the plunger 4 through the medium of the curved pitman 13.

The walking beam 11 is preferably consisted of a pair of spaced bars and the upper end of the pitman 13 is in the form of a yoke 15, for connection with the rod 16 that extends between the rear ends of the bars 14 of this walking beam 11.

My improved feeder further includes the provision of an upper pair of spaced levers 17, that are arranged in alignment with each other, these levers being pivotally connected at their rear ends to a cross rod 18 that extends between the standards 9 at a point below the rod 12.

The forward ends of these levers are operatively connected to the upper ends of the vertically disposed bars 19 that form a part of the feeder fork units denoted by the numeral 20.

Similar levers 21 are arranged below the levers 17 and are operatively connected at their rear ends to the standards 9 at a point below the connection between the rear ends of the levers 17 and said standards.

The forward ends of the lower pairs of levers are operatively connected with the side bars 19 of the feeder fork unit 20 at a point below the connection between the upper levers with the bars 19.

Figure 2:
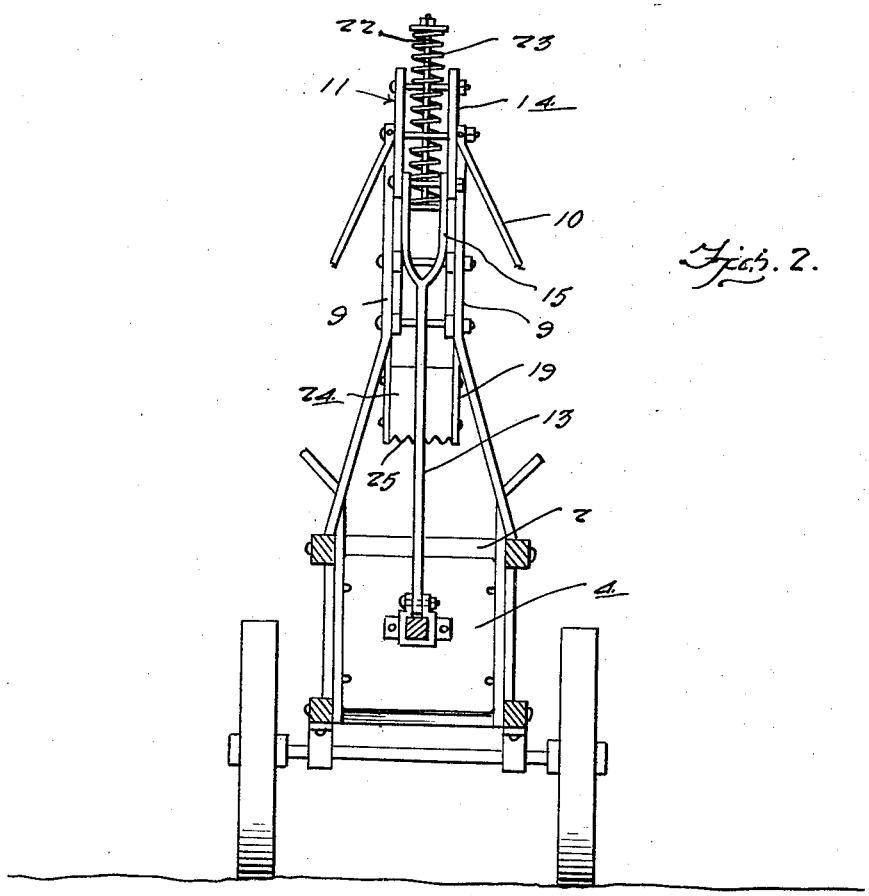
Figure 2 is a vertical sectional view taken approximately on the line 2—2 of Figure 1, looking in a left hand direction.

A rod 22 is arranged vertically between the forward ends of the bars 14 of the walking beam 11 and the lower end of the rod 22 is operatively connected with the intermediate portions of the levers 17 while the upper end of the rod extends above the upper end of the angularly disposed walking beam 11. Suitable shock absorbing springs 23 are associated with the rod 22, and the walking beam and levers 17 as clearly illustrated in Figures 1 and 2.

Figure 3:
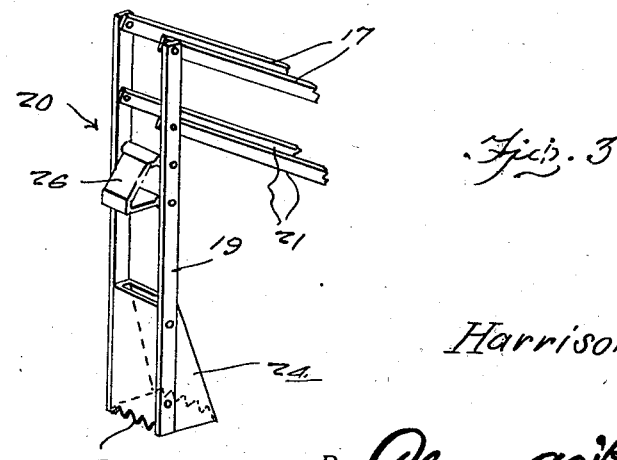
Figure 3 is a detail perspective view of the feeder fork unit, forming a salient part of the present invention.

Attached to the lower ends of the bars 19 of the fork unit 20 is the hay engaging shoe 24, the lower edges of the forward and rear sides thereof being serrated as indicated at 25, in Figure 3, also it will be observed that the rear side wall of this shoe is inclined.

A nose member 26 is secured between the intermediate portions of the bars 19 and extends outwardly therefrom for cooperation with the horizontally swinging block holder 27, that operates on a vertical rod 28.

The operation of my improved feeder may be briefly stated as follows: When the plunger rod is drawn rearwardly, the walking beam 11 is actuated, whereby to operate the levers 17 and this will move the feeder fork unit 20 downwardly in the hopper 3 and into the baling chamber 2, so as to press the hay down in said chamber. As the plunger is pushed forwardly in the baling chamber 2, the feeder fork unit is raised upwardly out of the baling chamber and the path of the plunger. In this manner, there is less danger of breaking parts, and furthermore the hay may be fed more easily to the baling chamber, also a feeder of this character will work better in long hay and it will not have a tendency to hammer off the leaves of the hay like the feeders now generally in use do.

Furthermore, the holder 27 positions the block in the path of the nose 26, said nose stripping the block from the holder and carrying said block downwardly in the baling chamber ahead of the plunger 4.

While I have shown the preferred embodiment of my invention, it is to be understood that various changes in the size, shape and arrangement of parts may be resorted to, without departing from the spirit of the invention or the scope of the appended claim.

What I claim is:

In a hay baler, a baling chamber provided with a feeding hopper in the top thereof, a plunger arranged for reciprocatory movement in the baling chamber, a reciprocatory plunger rod connected at the forward end to the plunger for operating the same, a vertically movable hay pushing unit arranged on the baler above the feed hopper and adapted to pass therethrough, and means for operatively connecting said pusher unit with the plunger rod whereby said pusher unit will force the hay downwardly in the baling chamber simultaneously with the rearward movement of the plunger in the baling chamber, the pusher unit being automatically raised to an inoperative position when the plunger moves forwardly in the baling chamber, said means including a pair of standards extending upwardly from the frame of the baler adjacent the rear portion of the baling chamber, a walking beam comprising a pair of connected, spaced, parallel bars, pivotally supported intermediate its ends between said standards, a bifurcated pitman pivotally connected, at one end, to the rear end of the walking beam and having its opposite end pivotally connected with the plunger rod at a point forwardly of the vertical plane of its connection with the walking beam, superposed pairs of parallel levers connected at their rear ends for pivotal movement between the standards at a point below the walking beam, the forward ends of the levers being operatively connected with the vertically movable pusher unit, and a yieldable operative connection between the forward end of the walking beam and the intermediate portions of the uppermost pair of levers.

In testimony whereof I affix my signature.

HARRISON FEIK.